United States Patent [19]
Cymbal

[11] Patent Number: 5,461,937
[45] Date of Patent: Oct. 31, 1995

[54] POSITION CONTROL APPARATUS FOR STEERING COLUMN

[75] Inventor: William D. Cymbal, Freeland, Mich.

[73] Assignee: General Motors Corporation, Detroit, Mich.

[21] Appl. No.: 331,409

[22] Filed: Oct. 31, 1994

[51] Int. Cl.⁶ ............................................. B62D 1/18
[52] U.S. Cl. .................. 74/493; 74/527; 280/775; 403/329
[58] Field of Search .................. 74/493, 527; 280/775; 403/326, 327, 328, 329

[56] References Cited

U.S. PATENT DOCUMENTS

| | | | |
|---|---|---|---|
| 2,792,719 | 5/1957 | Lanzone | 74/493 |
| 4,244,237 | 1/1981 | Sprunger | 74/493 |
| 4,472,982 | 9/1984 | Nishikawa | 74/493 |
| 4,732,050 | 3/1988 | Vollmer | 74/493 |
| 5,052,240 | 10/1991 | Miyoshi et al. | 74/493 |
| 5,064,219 | 11/1991 | Schaible et al. | 280/775 |
| 5,088,767 | 2/1992 | Hoblingre et al. | 280/775 |
| 5,161,425 | 11/1992 | Baskett et al. | 74/493 |
| 5,213,003 | 5/1993 | Speich | 74/527 |
| 5,265,492 | 11/1993 | Snell | 280/775 |
| 5,301,567 | 4/1994 | Snell et al. | 74/493 |
| 5,377,555 | 1/1995 | Hancock | 74/493 |
| 5,394,767 | 3/1995 | Hoblingre et al. | 74/493 |

Primary Examiner—Charles A. Marmor
Assistant Examiner—David Fenstermacher
Attorney, Agent, or Firm—Saul Schwartz

[57] ABSTRACT

A position control apparatus for an adjustable motor vehicle steering column including a clamp having a first jaw element and a second jaw element shiftable axially relative to each other, a control lever pivotable through an angular stroke in opening and closing directions, a primary cam means for converting pivotal movement of the control lever in the closing direction to a uniform axial stroke of the first jaw element relative to the second jaw element, and a secondary cam means for converting pivotal movement of the control lever in the opening direction to a snap-action axial stroke of the first jaw element relative to the second jaw element at a terminal end of the angular stroke of the control lever in the opening direction.

5 Claims, 4 Drawing Sheets

POSITION CONTROL APPARATUS FOR STEERING COLUMN

FIELD OF THE INVENTION

This invention relates to position control apparatus for adjustable motor vehicle steering columns.

BACKGROUND OF THE INVENTION

Position control apparatuses for adjustable motor vehicle steering columns commonly include a stationary bracket having parallel legs straddling the steering column, a movable bracket on an adjustable mast jacket of the steering column having a leg juxtaposed a leg of the stationary bracket, and a clamp which squeezes together the juxtaposed legs of the stationary and movable brackets when a control lever is pivoted through an angular stroke. In some clamps, a rotary cam converts rotation of the control lever to uniform axial strokes between jaw elements of the clamp when the clamp is opened and closed. In clamps having interlocking features such as spline teeth, the teeth may interfere with each other and disturb smooth and quiet adjustment of the steering column unless adjustment is delayed until the clamp is completely open.

SUMMARY OF THE INVENTION

This invention is a new and improved position control apparatus for an adjustable motor vehicle steering column including a clamp having a first jaw element and a second jaw element shiftable axially relative to each other, a control lever pivotable through an angular stroke in opening and closing directions, a primary cam for converting pivotal movement of the control lever in the closing direction to a uniform axial stroke of the first jaw element relative to the second jaw element, and a secondary cam for converting pivotal movement of the control lever in the opening direction to a snap-action axial stroke of the first jaw element relative to the second jaw element.

DESCRIPTION OF A PREFERRED EMBODIMENT

Figure 1:
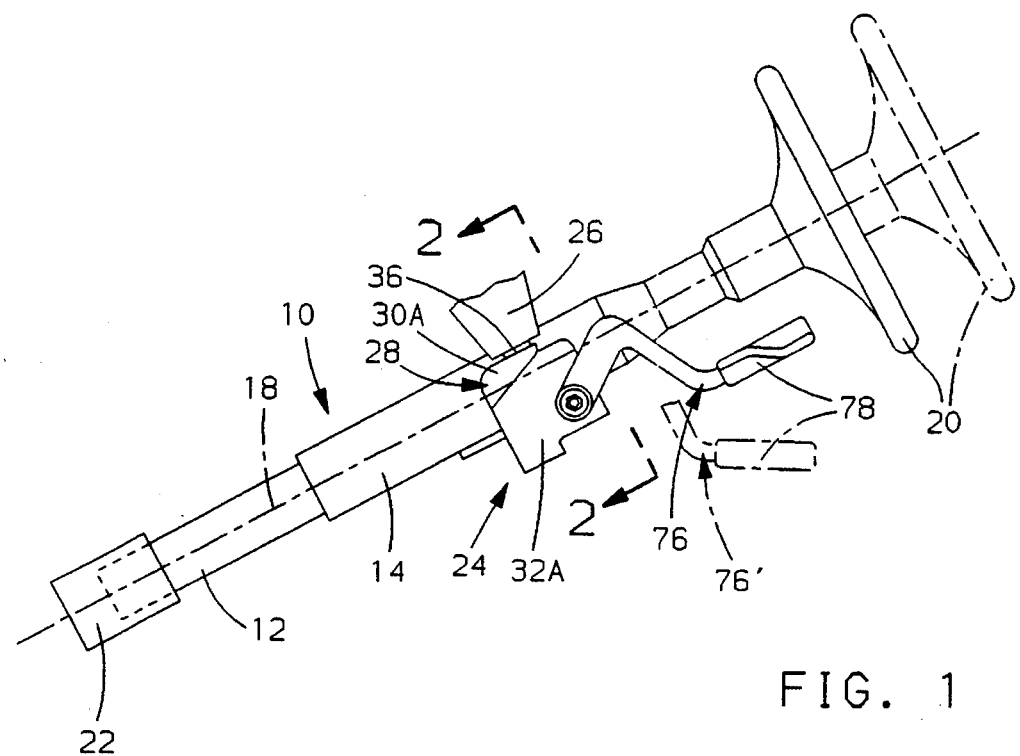
FIG. 1 is an elevational view of an adjustable motor vehicle steering column having a position control apparatus according to this invention.

Referring to FIG. 1, a motor vehicle steering column 10 includes a tubular lower mast jacket 12 and a tubular upper mast jacket 14 telescopically overlapping the lower mast jacket. Energy absorbing apparatus, not shown, in the annulus between the upper and lower mast jackets prevents relative movement therebetween except in collapse event during which the upper mast jacket collapses telescopically over the lower mast jacket. A steering shaft 16 is supported on the mast jackets 12, 14 for rotation about a longitudinal centerline 18 of the steering column. A steering wheel 20 is attached to the steering shaft outboard of the upper mast jacket.

The lower end of the lower mast jacket 12 is mounted on a vertical panel, not shown, of a motor vehicle body through a sleeve 22 rigidly attached to the vertical panel. The lower mast jacket 12 is movable in and out in the sleeve 22 in the direction of the longitudinal centerline 18 of the steering column for adjusting the horizontal position of the steering wheel within a range represented in FIG. 1 by solid and broken line positions of the steering wheel. In a collapse event of the steering column, the sleeve seizes the lower mast jacket 12 to prevent movement thereof in the direction of the centerline 18. A position control apparatus 24 according to this invention is disposed between the steering column 10 and a structural element 26 of the vehicle body.

As seen best in FIGS. 1–2, the control apparatus includes a first bracket 28 having a pair of horizontal flanges 30A–B, a pair of vertical legs 32A–B on opposite sides of the upper mast jacket 14, and a web 34 below the upper mast jacket between the vertical legs. The horizontal flanges 30A–B have a pair of slots therein each of which slidably receives a capsule 36. Each capsule is open in the center for passage therethrough of a hanger bolt, not shown, attached to the structural element 26. Nuts, not shown, on the hanger bolts below the capsules rigidly affix the capsules to the structural element 26 so that, except in an energy absorbing collapse event, the first bracket 28 is stationary relative to the vehicle body.

A second bracket 38 of the position control apparatus 24 in the shape of an inverted "U" is rigidly attached to the upper mast jacket 14 and includes a pair of vertical legs 40A–B juxtaposed the stationary vertical legs 32A–B, respectively. The second bracket 38 is movable with the upper mast jacket in the direction of the centerline 18 of the steering column. The stationary vertical legs 32A–B have a pair of apertures 42A–B therein aligned on a lateral centerline 44 of the position control apparatus. The movable vertical legs 40A–B have a pair of horizontal slots 46A–B therein, respectively, which register with the apertures 42A–B, respectively.

Figure 2:
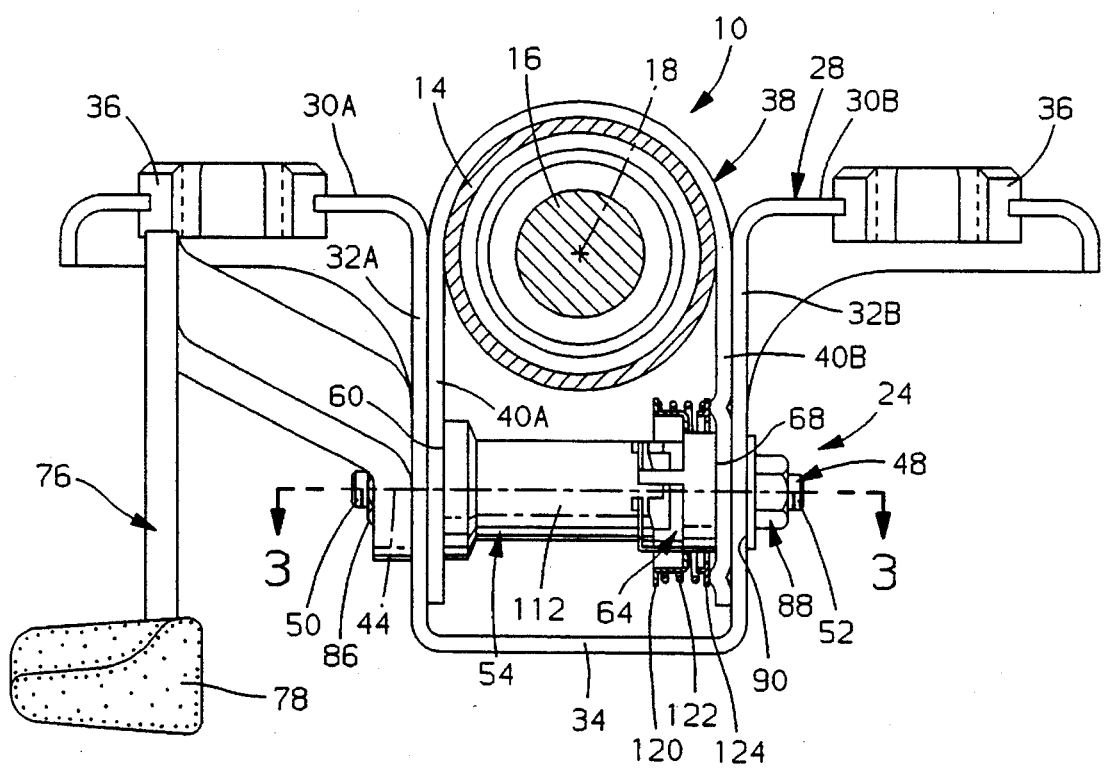
FIG. 2 is an enlarged sectional view taken generally along the plane indicated by lines 2—2 in FIG. 1.
Figure 3:
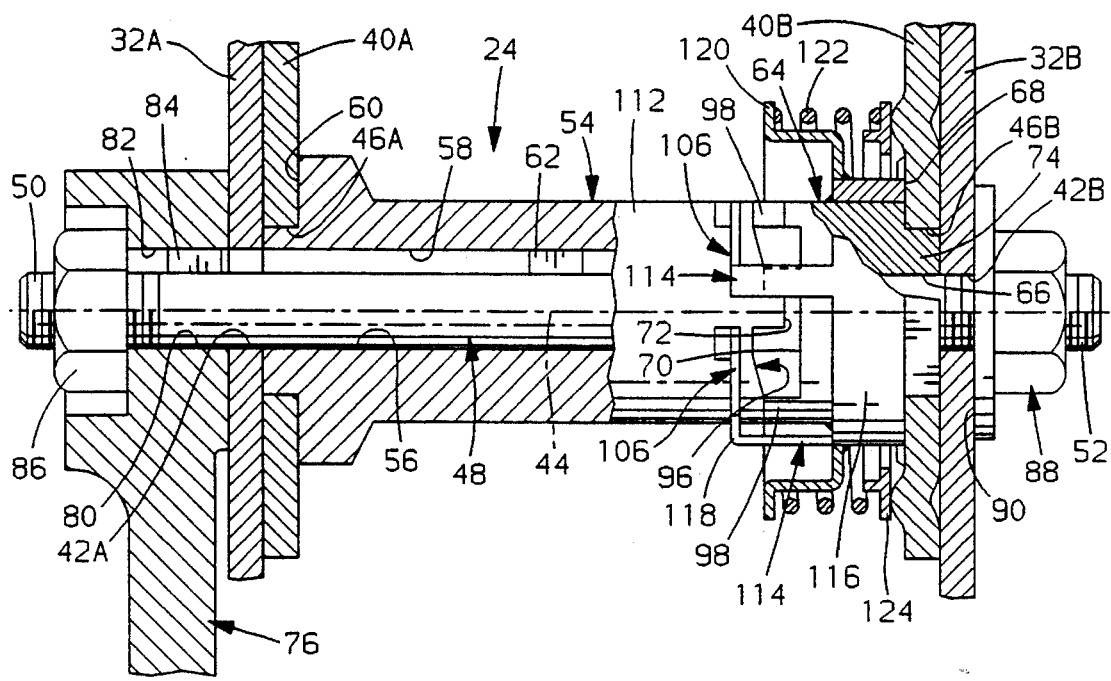
FIG. 3 is a partially broken away sectional view taken generally along the plane indicated by lines 3—3 in FIG. 2.
Figure 5A:
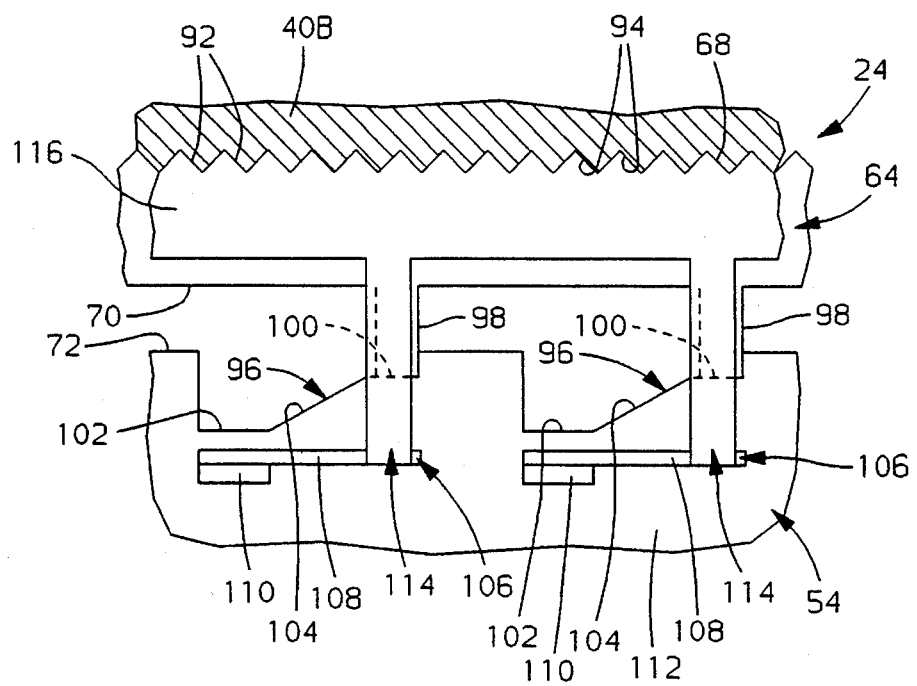
FIGS. 5A–5D are schematic representations of the primary and the secondary cams of the position control apparatus according to this invention in different relative positions.
Figure 4:
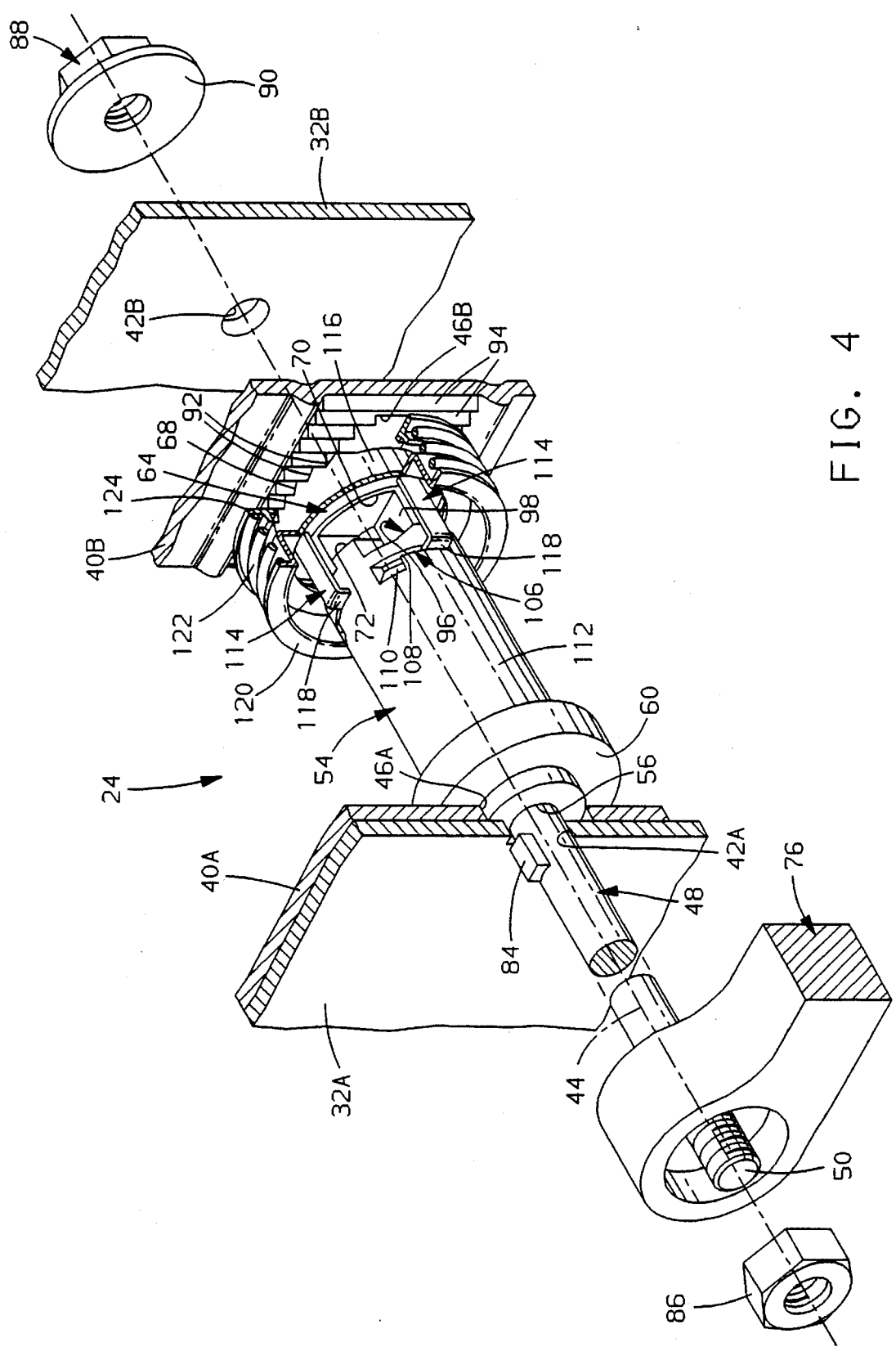
FIG. 4 is a fragmentary, exploded perspective view of the position control apparatus according to this invention.

As seen best in FIGS. 2–4, a control shaft 48 of the position control apparatus 24 is supported on the stationary bracket 28 by the apertures 42A–B for rotation about the lateral centerline 44. The horizontal slots 46A–B straddle the control shaft 48 so that the ends of the slots define the limits of the range of positions of the movable bracket 38 and the upper mast jacket 14. The control shaft 48 has a first screw thread 50 at one end outboard of the stationary vertical leg 32A and a second screw thread 52 at the other end outboard of the stationary vertical leg 32B.

A first tubular barrel 54 of the control apparatus 24 has a center bore 56 therethrough and a key slot 58 opening into the bore. The bore 56 fits over the control shaft between the movable vertical legs 40A–B so that the first tubular barrel is mounted on the control shaft with an annular first end 60 of the first tubular barrel facing the movable vertical leg 40A. A key 62 on the control shaft 48 is received in the key slot 58 whereby the control shaft and the first tubular barrel are rotatable as a unit about the lateral centerline 44.

A second tubular barrel 64 of the control apparatus 24 is journaled on the control shaft 48 between the first tubular barrel 54 and the movable vertical leg 40B by a plain bore 66 in the second tubular barrel. The second tubular barrel has an annular first end 68 facing the movable vertical leg 40B and an annular second end 70 facing an annular second end 72 on the first tubular barrel 54. A square pilot 74, FIG. 3, on the second tubular barrel around the plain bore 66 therein extends into the horizontal slot 46B in the movable vertical leg 40B to prevent rotation of the second tubular barrel about the lateral centerline 44 without interfering with movement of the vertical leg 40B and the upper mast jacket 14 in the direction of the longitudinal centerline 18 of the steering column.

A control lever 76 of the position control apparatus 24 has a finger tab 78 at one end thereof and a bore 80 at the other end thereof with a key slot 82 opening into the bore. The bore 80 fits over the control shaft 48 outboard of the stationary vertical leg 32A with a key 84 on the control shaft extending into the key slot 82 uniting the control lever and the control shaft for unitary rotation about the lateral centerline 44. A first nut 86 on the first screw thread 50 on the control shaft retains the control lever on the control shaft. A second nut 88 on the second screw thread 52 on the control shaft outboard of the stationary vertical leg 32B and has an annular washer side 90 bearing against the stationary vertical leg 32B.

The annular first end 68 of the second tubular barrel has a plurality of vertical abutments or splines 92 thereon. The movable vertical leg 40B has a plurality of similar vertical splines 94 thereon above and below the horizontal slot 46B. The annular first end 68 of the second tubular barrel and the washer side 90 of the second nut 88 define first and second jaw elements, respectively, of a clamp for squeezing the movable vertical leg 40B against the stationary vertical leg 32B. When the clamp is closed, FIGS. 2, 3, 5A and 5B, the spline teeth 92, 94 mesh to positively prevent relative movement between the movable leg 40B and the stationary bracket 28 in the direction of the longitudinal centerline. When the clamp is open, FIG. 5C, the spline teeth are fully separated for smooth and quiet adjustment of the position of the steering wheel 20.

As seen best in FIGS. 3–5, the position control apparatus 24 further includes a plurality of primary cams 96 in the annular second end 72 of the first tubular barrel and a corresponding plurality of primary cam followers 98 on the annular second end 70 of the second tubular barrel. Each primary cam 96 has an upper platform 100, a lower platform 102, and a ramp 104 between the upper and lower platforms. The aforesaid clamp defined by the annular first end 68 of the second tubular barrel and the washer side 90 of the second nut is closed when the primary cam followers 98 are seated on the upper platforms 100 and is open when the primary cam followers are seated on the lower platforms 102.

Each of a plurality of secondary cams 106 of the position control apparatus 24 on the first tubular barrel includes a circumferential groove 108 in a plane perpendicular to the lateral centerline 44 and a ramp 110 tipped back from the aforesaid plane of the circumferential grooves extending from the bottom of the corresponding groove to a cylindrical outer wall 112 of the first tubular barrel. A plurality of radially flexible secondary cam followers 114 are formed integrally with a sleeve 116 welded or otherwise rigidly attached to the second tubular barrel 64 around an outer cylindrical wall thereof. Each of the secondary cam followers 114 is parallel to the lateral centerline 44 and has a finger 118, FIGS. 3–4, at a distal end thereof which cooperates with a corresponding one of the secondary cams 106 as described below.

An annular first spring seat 120 is welded to the sleeve 116. A spring 122 around the sleeve 116 bears at one end against the first spring seat 120 and at the other end against an annular second spring seat 124. The movable vertical leg 40B is slidable under the annular second spring seat 124 during movement of the upper mast jacket relative to the stationary bracket 28. The spring 122 biases the second tubular barrel 64 toward the first tubular barrel 54 and the second spring seat 124 against the movable vertical leg 40B and urges relative separation between the jaw elements of the clamp defined by the annular first end 68 of the second tubular barrel and the washer side 90 of the second nut 88.

The clamp defined by the annular first end 68 of the second tubular barrel and the washer side 90 of the second nut is closed in an up position of the control lever 76, FIG. 1. In the corresponding angular position of the first tubular barrel relative to the second tubular barrel, the primary cam followers 98 seat on the upper platforms 100 and the fingers 118 on the secondary cam followers 114 seat in the circumferential grooves 108 near the ends of the latter opposite the ramps 110, FIGS. 2, 3 and 5A. In that circumstance, the vertical legs 40B, 32B are squeezed between the annular first end 68 of the second tubular barrel 64 and the washer side 90 of the second nut for maximum frictional retention and the spline teeth 92 are held in engagement with the spline teeth 94 for maximizing the integrity of the retention of the upper mast jacket 14 relative to the stationary bracket 28 so that in an energy absorbing collapse event, the stationary bracket releases immediately from the capsules 36.

Figure 5B:
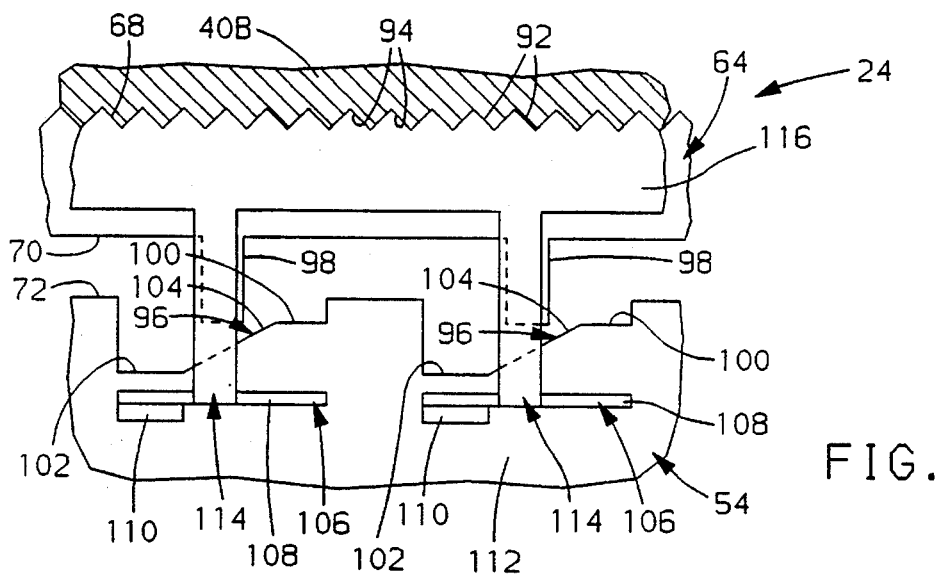
Figure 5C:
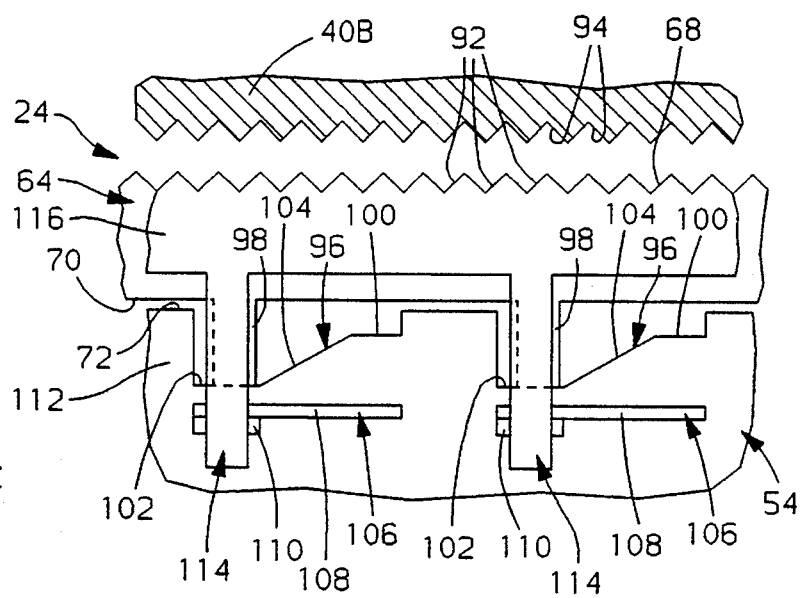
Figure 5D:
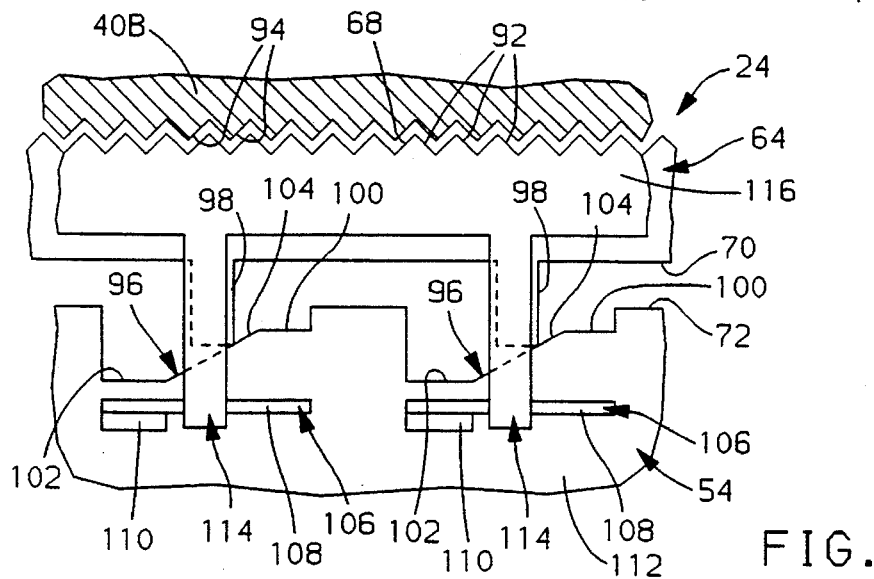

To release the upper mast jacket 14 for positional adjustment of the steering wheel 20, the control shaft 48 and control lever 76 are pivoted clockwise, FIG. 1, by manual force on the finger tab 78 through an angular stroke from the up position of the lever to a down position 76', FIG. 1. Rotation of the control shaft induces rotation of the first tubular barrel relative to the second tubular barrel. Initially, the primary cam followers 98 separate from the upper platforms 100 and are urged by the spring 122 toward the ramps 104. As best seen in FIG. 5B, because the circumferential grooves 108 are straight, the fingers 118 on the secondary cam followers 114 resist the spring 122 and prevent the primary cam followers from traversing the track dictated by the ramps 104 and maintain the clamp closed until near the terminal end of the angular stroke of the control lever from the up position to the down position.

The fingers 118 on the secondary cam followers achieve registry with the ramps 110 at the ends of the circumferential grooves 108, the primary cam followers 98 achieve alignment with the lower platforms 102 of the primary cams, and the control lever 76 achieves the down position 76' all concurrently. At that instant, the spring 122 opens the clamp defined by the annular first end 68 of the second tubular barrel and the washer side 90 of the second nut by axially stroking the second tubular barrel 64 in snap-action fashion until the primary cam followers 98 seat on the lower platforms 102 of the primary cams, FIG. 5C. Concurrently, the fingers 118 on the secondary cam followers are forced up the ramps 110 onto the outer cylindrical wall 112 of the first tubular barrel and are maintained in contact therewith by the resilience of secondary cam followers. It is, therefore, not possible for an operator to prematurely adjust the position of the steering wheel 20 in an intermediate position of the control lever between the up position and the down position thereof.

When a comfortable position of the steering wheel 20 is achieved, the control lever 76 is rotated back toward the up position. Because the fingers 118 on the secondary cam followers 114 are out of the circumferential grooves 108, the primary cam followers 98 traverse the ramps 104 of the primary cams so that the clamp closes in a uniform axial stroke as the first tubular barrel 54 rotates relative to the second tubular barrel 64, FIG. 5D. The axial stroke of the second tubular barrel 64 causes concurrent axial movement of the fingers 118 across the outer cylindrical wall 112 of the first tubular barrel and reentry into the circumferential grooves 108 in preparation for another cycle of the clamp from closed to open.

The embodiments of the invention in which an exclusive property or privilege is claimed are defined as follows:

1. A position control apparatus for a motor vehicle steering column having a mast jacket movable in the direction of a longitudinal centerline of said steering column through a range of adjusted positions comprising:

a stationary bracket having a stationary leg in a vertical plane adjacent said mast jacket, a movable bracket attached to said mast jacket having a movable leg in a vertical plane juxtaposed said stationary leg and movable with said mast jacket relative to said stationary leg, a clamp means on said stationary bracket operative to prevent movement of said mast jacket through said range of adjusted positions when said clamp means is closed and to permit movement of said mast jacket through said range of adjusted positions when said clamp means is open including a first jaw element on a first side of said movable leg and a second jaw element on an opposite second side of said juxtaposed stationary leg, a control lever pivotable through an angular stroke in an opening direction between an up position and a down position and in an opposite closing direction between said down position and said up position, a primary cam means connecting said control lever and said first jaw element operative to close said clamp means by moving said first jaw element through an axial stroke toward said second jaw element concurrently and uniformly with pivotal movement of said control lever through said angular stroke thereof in said closing direction, and a secondary cam means connecting said control lever and said first jaw element operative to open said clamp means by moving said first jaw element through said axial stroke away from said second jaw element in snap-action fashion at a terminal end said pivotal movement of said control lever through said angular stroke thereof in said opening direction so that said clamp means is not open and said mast jacket is not movable relative to said stationary bracket until said terminal end of said pivotal movement of said control lever in said opening direction.

2. The position control apparatus recited in claim 1 further comprising:

a spring between said first jaw element and said movable leg biasing said first jaw element away from said second jaw element.

3. The position control apparatus recited in claim 2 wherein said primary cam means includes:

a control shaft rotatable about a lateral centerline perpendicular to each of said movable leg and said juxtaposed stationary leg, a first tubular barrel rotatable as a unit with said control shaft about said lateral centerline, a second tubular barrel having said first jaw element defined on a first annular end thereof facing said movable leg rotatably journaled on said control shaft and restrained against rotation about said lateral centerline, a primary cam on an annular end of said first tubular barrel, and a primary cam follower on a second annular end of said second tubular barrel facing said annular end on said first tubular barrel engageable on said primary cam.

4. The position control apparatus recited in claim 3 wherein said secondary cam means includes:

a secondary cam on said first tubular barrel including a circumferential groove in an outer cylindrical wall of said first tubular barrel in a plane perpendicular to said lateral centerline and a ramp at an end of said circumferential groove tipped back from said plane perpendicular to said longitudinal centerline and extending from a bottom of said groove to said outer cylindrical wall of said first tubular barrel, a resilient secondary cam follower on said second tubular barrel flexible perpendicular to said lateral centerline, and a finger on said secondary cam follower resiliently biased thereby toward said first tubular barrel so that said finger seats in said circumferential groove during pivotal movement of said control lever through said angular stroke thereof in said opening direction and is guided by said ramp onto said outer cylindrical wall of said first tubular barrel at said terminal end of said angular stroke of said control lever in said opening direction.

5. The position control apparatus recited in claim 4 further comprising:

a plurality of vertical spline teeth on said first annular end of said second tubular barrel, and a plurality of vertical spline teeth on said movable leg meshing with said vertical spline teeth on said second tubular barrel when said clamp means is closed and separated from said vertical spline teeth on said second tubular barrel when said clamp means is open.

* * * * *